United States Patent [19]
Doherty et al.

[11] Patent Number: 4,564,762
[45] Date of Patent: Jan. 14, 1986

[54] SMOKE DETECTOR

[75] Inventors: Charles F. Doherty, Quincy; Robert E. Johnson, Pembroke, both of Mass.

[73] Assignee: Pyrotector, Inc., Hingham, Mass.

[21] Appl. No.: 610,760

[22] Filed: May 16, 1984

[51] Int. Cl.[4] .......... G01T 1/185
[52] U.S. Cl. .......... 250/381; 250/385
[58] Field of Search .......... 250/381, 384, 385, 382, 250/389; 340/629

[56] References Cited

U.S. PATENT DOCUMENTS

| | | | |
|---|---|---|---|
| 3,934,145 | 1/1976 | Dobrzanski et al. | 250/389 |
| 4,171,486 | 10/1979 | Dobrzanski | 250/381 |
| 4,238,788 | 12/1980 | Rosauer et al. | 250/381 |
| 4,336,455 | 6/1982 | Bryant | 250/381 |

OTHER PUBLICATIONS

"The Dynamic Duo", trade brochure, Pyrotector, Inc. Hingham, MA, Feb. 1983.

*Primary Examiner*—Carolyn E. Fields

[57] ABSTRACT

An ionization detector unit for use in a smoke detector includes a housing wall enclosing an ionization chamber, the wall having openings for passage of air through the chamber, the frontal surface of the wall that is exposed to an oncoming air flow from a given direction being inclined relative to an intersecting second surface exposed to the flow. The frontal surface is shaped and positioned to deflect the air flow generally toward the second surface, and the second surface is shaped and positioned to deflect the air flow generally toward the frontal surface, the shape and position of the surfaces cooperatively arranged to cause the deflected air flows to converge and form a region of air in the vicinity of the intersection of the surfaces that is at higher pressure and slower velocity than the oncoming air flow. Apertures are provided in the frontal surface of the housing to enable entry of air from the vicinity of the intersection to establish relatively slow, laminar air flow through the chamber, thereby to enable an effective ion current to be maintained within the chamber despite high velocity of oncoming air.

8 Claims, 11 Drawing Figures

SMOKE DETECTOR

BACKGROUND OF THE INVENTION

The invention relates to detecting the presence of cumbustion products in the air by use of an ion chamber. Smoke particles within the ionization chamber cause a change in ion current. When the change exceeds a predetermined level, an alarm signal is triggered.

In conditons of relatively high ambient air flow velocity, i.e. above about 500 feet per minute, the performance of prior art smoke detectors of the ionization type begins to decrease with increase in flow velocity. For example, in unipolar devices, increased ambient air flow velocity typically moves the device away from alarm condition and an abnormally high level of smoke density is required to trigger an alarm; in bipolar devices, increased ambient air flow velocity moves the device toward alarm condition so a false alarm can be triggered by a small amount or even no smoke. Typically, maximum rates of ambient air flow above which the particular detector should not be employed are stated by the manufacturer.

It is an objective of this invention to provide a smoke detector of the ionization type that operates reliably at relatively high ambient air flow velocity.

SUMMARY OF THE INVENTION

It has been discovered that the observed drop in performance of prior art smoke detectors of the ionization type under high ambient flow velocity conditions, i.e. beginning above 500 feet per minute, results at least in part from divergent curls of high velocity generated with the ionization chamber, e.g. due to the very low pressure region created at the rear of the chamber housing by the unimpeded air flow passing over the end surface of the housing.

According to the invention an ionization detector unit for use in a smoke detector comprises a housing wall enclosing an ionization chamber, the wall having openings for passage of air through the chamber, the frontal surface of the wall that is exposed to an oncoming air flow from a given direction being inclined relative to an intersecting second surface exposed to the flow, the frontal surface being shaped and positioned to deflect the air flow generally toward the second surface, and the second surface being shaped and positioned to deflect the air flow generally toward the frontal surface, the shape and position of the surfaces cooperatively arranged to cause the deflected air flows to converge and form a region of air in the vicinity of the intersection of the surfaces that is at higher pressure and slower velocity than the oncoming air flow, apertures in the frontal surface of the housing enabling entry of air from the vicinity to establish relatively slow, laminar air flow through the chamber thereby to enable an effective ion current to be maintained within the chamber despite high velocity of oncoming air.

In preferred embodiments, the frontal surface and the second surface conform substantially to portions of the surface of axially aligned, intersecting, opposed right cones; where the detector unit is adapted to be exposed to air flow from various directions, the housing wall and the second wall are generally frusto-conical in shape and have substantially the same cone angles, preferably a plurality of the openings are disposed about the housing surface to accommodate passage of air through the chamber from different directions, and portions of the housing surface extend across the openings and are spaced radially outward therefrom defining narrow apertures for limited entry of air into the chamber; the second surface extends away from the intersection a distance of at least one third the corresponding dimension of the frontal surface; the axial extents of both the surfaces from the intersection are substantially the same; the surfaces diverge from each other at an angle of about 150 degrees; both the surfaces extend circumferentially about the axis of the unit, the first surface being frusto-conical in shape and the second surface being substantially equal and opposite in shape; and the unit enables the effective ion current to be maintained at oncoming air flow velocities of up to about 2,500 feet per minute.

PREFERRED EMBODIMENT

We first briefly describe the drawings.

DRAWINGS

STRUCTURE

Figure 1:
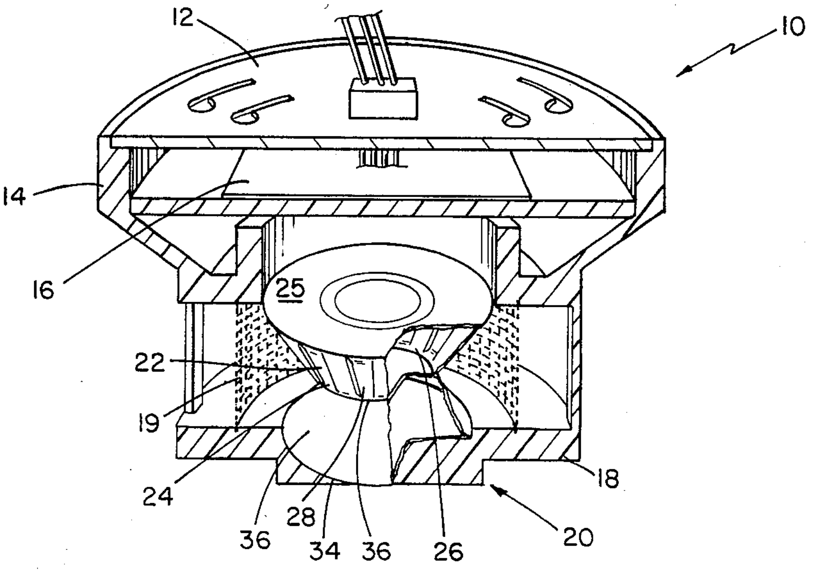
FIG. 1 is a perspective view, partially in section, of a smoke detector equipped with the detector unit of the invention.
Figure 2:
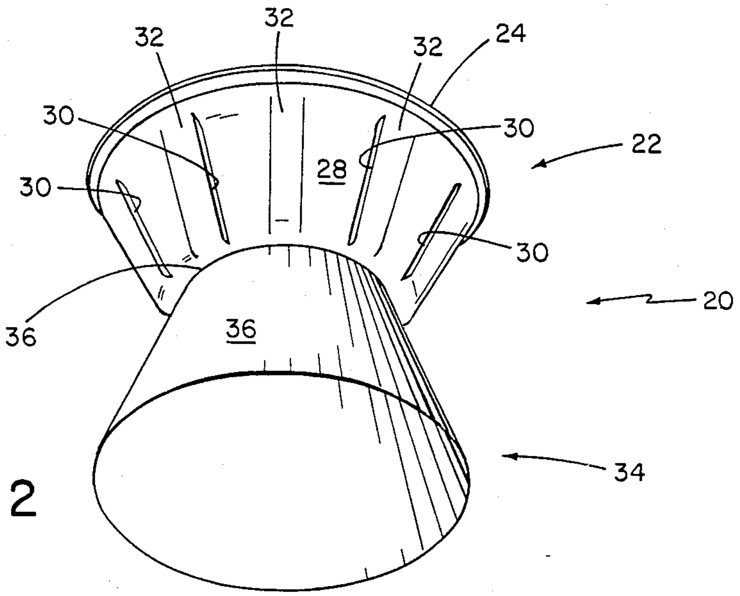
FIG. 2 is a similar enlarged view of the unit.

The ionization-type smoke detector 10 shown in FIG. 1 includes a base plate 12 for attaching the detector to a ceiling, an upper housing 14 fixed to the base plate and enclosing the detector circuitry 16, and, depending from the upper housing, a lower housing 18 including a perforated circumferential screen 19 within which lies the detector unit 20 of the invention, shown in enlarged scale in FIG. 2.

The detector unit includes ionization chamber 22, e.g. of the bi-polar type manufactured and sold by Amersham Corporation of Arlington Heights, Ill., as described in Bryant U.S. Pat. No. 4,336,455, the disclosure of which is incorporated herein by reference, and deflector 34. The ionization chamber is defined by an inverted frusto-conical housing/outer electrode 24 having a flat base 25, a substantially flat, imperforate end surface 26, and a circumferential side surface 28 extending upwardly from the end surface and outwardly therefrom at angle, a, about 15 degrees, to a vertical height, x, typically about 0.4 inch. The base 25 is about 1.35 inches in diameter, while end surface 26 has a diameter of about 1.0 inch. Housing 24, typically formed in a metal stamping operation, includes restricted apertures 30 formed about the housing surface by bowing segments 32, about 0.180 inch wide, of the side surface 28 locally outward. In this manner, narrow passages, typically about 0.060 inch at their maximum, are provided to allow a restricted flow of ambient air to enter the chamber around the bowed segments, but not directly toward the center of the chamber. (This feature is also necessary to prevent escape of ions from the chamber.)

Deflector 34, e.g. typically formed of plastic, extends below housing 24. The deflector also has a frusto-conical shape substantially equal and opposite to that of the housing, excluding the vent covers, and intersects the surface of the housing at parting line 36, generally where the end surface 26 and diverging side surfaces 28 of housing 22 intersect. The surface 36 of the deflector diverges downwardly from the intersection with the housing at an angle, a', generally equal to angle, a, of the housing surface to a vertical height, x', also generally equal to height, x, of the chamber housing.

OPERATION

Figure 4:
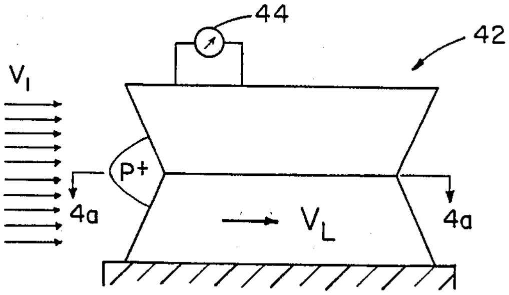
FIG. 4 is a similar view of the detector unit of the invention, while FIG. **4*a* is a top section view taken at 4*a*—4*a* of FIG. 4**.
Figure 3:
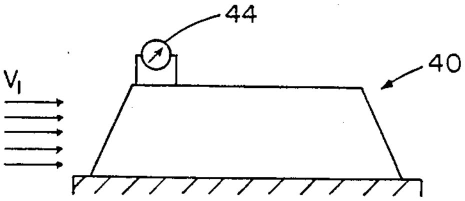
FIG. 3 is a diagrammatic side view of the prior art ionization chamber housing.

Referring to FIGS. 3 and 4, the ionization chamber of a prior art ionization chamber housing 40 was connected to meter 44 for monitoring of ionization chamber collector potential. The housing was then subjected to ambient air flow velocity of $V_1$ up to about 1,000 feet per minute. The resulting curve (H, FIG. 5) shows a sharp peak at about 100 feet per minute, and continuous decay for ambient flow above about 500 feet per minute.

Referring to FIG. 4, the collector potential of detector unit 42 of the invention was also monitored for performance in ambient flow a velocity of $V_1$. The resulting curve (D, FIG. 5) is substantially constant for the range of ambient velocity up to at least 2,500 feet per minute. Thus the ionization chamber of the detector unit was substantially unaffected by increased ambient air flow velocity, indicating that velocity of air within the chamber was substantially laminar, $V_L$.

To attempt to explain the observed improved performance of the chamber in the detector unit at high ambient air flow velocity, the air flow paths about the prior art housing and about the detector unit were evaluated.

In the prior art ionization chamber housing, e.g. as in FIG. 3, air flowing closely above the housing (and some of the air deflected from the front surface) join to flow across the end surface of the housing. As this portion of the flow is essentially unimpeded, the ambient velocity is maintained. As a result of this rapid air flow across the end surface of the housing, a very low pressure region is created behind the housing, which causes the flow to curl back into the chamber from the rear to create divergent curls of locally high velocity with the chamber. This turbulent flow within the chamber disrupts the flow of ions and thus adversely affects performance of the detector device.

Figure 5:
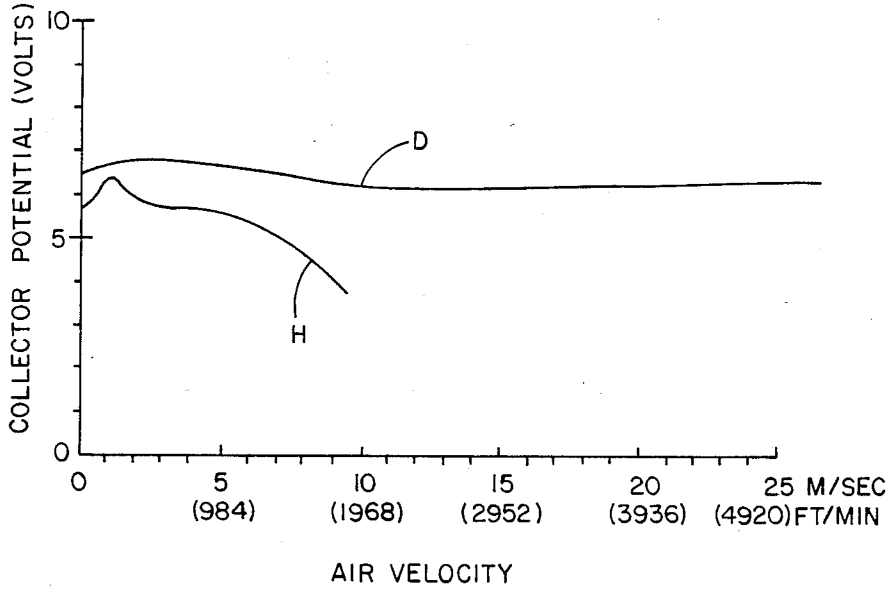
FIG. 5 is a plot of collector potential versus ambient air flow velocity.
Figure 4A:
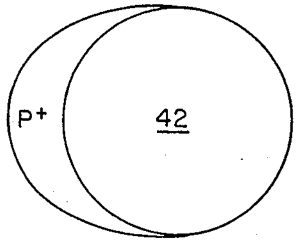
FIG 4a PRIOR ART

Referring to FIG. 5 et. seq., and also to FIGS. 4 and 4*a*, the effect of the deflector upon ambient air flow about and also within the ionization chamber housing will be described.

Figure 6:
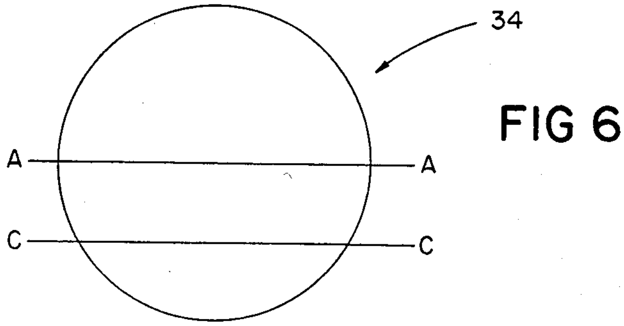
FIG. 6 is a diagrammatic plan view of the detector unit.
Figure 6A:
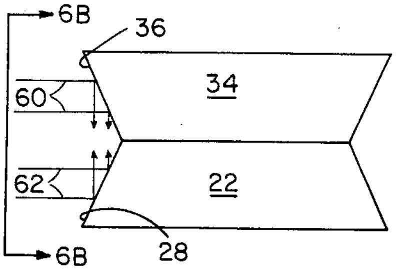
FIG. 6A is a side section view taken at line A—A and FIG. 6B is a similar view taken at right angle thereto at the line 6B—6B.
Figure 6B:
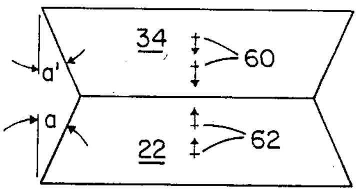
Figure 6C:
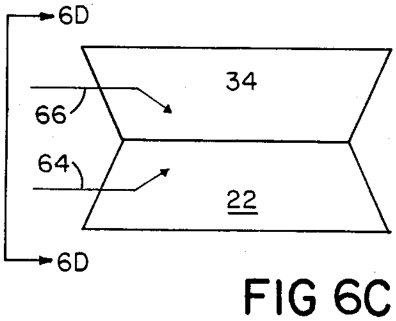
FIG. 6C is a side section view taken at line C—C and FIG. 6D is a similar view taken at right angle thereto at the line 6D—6D.
Figure 6D:
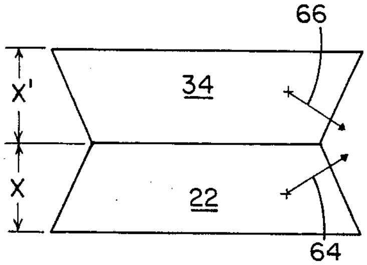

In FIG. 6, the detector unit comprising deflector 34 and ionization chamber housing 24 is shown in plan view with lines A—A and C—C indicating vertical planes of ambient air flow. Separate air flow components (arrows 60, 62) in the plane A—A (FIGS. 6A and 6B) impinge upon the opposed surfaces 36, 28 of the deflector and the housing. Corresponding segments of the flow are deflected directly down toward the parting line between the housing and the deflector on opposed paths. The result is a merging of opposing flow components to cause a substantially stagnant pressure wave or pressure pillow P+ (FIGS. 4 and 4*a*) in the region of the parting line. The effect is at a maximum at the intersection of the plane A—A and the parting line. It extends about $\frac{1}{8}$ inch above and below the line along A—A, and also extends with lessening effect almost 90 degrees from the line A—A in each direction about the circumference. The circumferential effect is due to the components of flow in other planes, e.g. in plane C—C. Referring to FIGS. 6C and 6D, arrows 64, 66 striking the deflector and the housing are deflected into opposition, but at lesser angle (FIGS. 6C and 6D) due to the sloping surfaces of the deflector and the housing. The effects of pressure equalization at the front of the detector unit extend to the area behind the housing so the area of very low pressure which caused the reverse curl observed in the prior art device does not develop. Thus the pressure differential in the area of the chamber, both within and without the housing, is much reduced over that prior art device, and essentially laminar flow ($V_L$), without significant turbulence, is maintained within the chamber and ion flow is not disrupted to any significant degree. (While some air does enter the chamber on the flow paths corresponding to line C—C, without the effect of the low pressure region created at the rear of the housing, the flow components remain essentially laminar and pass through the chamber substantially without adverse effect on ion flow.)

OTHER EMBODIMENTS

Other embodiments are within the following claims. For example, deflectors of different vertical height, e.g. deflectors down to about one third the height of the chamber housing may be expected to provide significant improvement over performance of the chamber alone, or different angles of divergence may be employed with frusto-conical ionization chamber housings, or deflectors having other configurations of opposing surfaces may be provided to improve the performance of correspondingly-shaped ionization chamber housings in high ambient air flow velocity conditions. The detector unit may be disposed in other orientations. The deflector and ionization chamber housing may be formed or provided as an integral unit. Where desired, both opposed surfaces may house ionization chambers.

Where ambient air flow is undirectional, e.g. in a duct, the deflector surface may be less than circumferential, e.g. a surface extending about 60 degrees to both sides of center would be expected to result in substantial improvement in performance over that of the ionization chamber alone.

What is claimed is:

1. An ionization detector unit for use in a smoke detector comprising a housing wall enclosing an ionization chamber, said wall having openings for passage of air through said chamber, the frontal surface of said wall that is exposed to an oncoming air flow from a given direction being inclined relative to an intersecting second surface exposed to said flow, said frontal surface being shaped and positioned to deflect said air flow generally toward said second surface, and said second surface being shaped and positioned to deflect said air flow generally toward said frontal surface, said frontal surface and said second surface conforming substantially to portions of the surface of axially aligned, intersecting, opposed right cones, the shape and position of said surfaces cooperatively arranged to cause said deflected air flows to converge and form a region of air in the vicinity of the intersection of said surfaces that is at higher pressure and slower velocity than said oncoming air flow, openings in said frontal surface of said housing are sized and positioned for entry of air from said vicinity in a relatively slow, laminar air flow through said chamber said frontal surface and said second surface comprising means for maintaining an effective ion current within said chamber despite the velocity of the oncoming air.

2. The ionization detector unit of claim 1 wherein said housing wall and said second wall are generally frusto-conical in shape and have substantially the same cone angles, said shape and angles being such that an effective ion current is maintained with an oncoming air flow from various directions.

3. The ionization detector unit of claim 2 wherein a plurality of said openings are disposed about the housing surface to accommodate passage of air through said chamber from different directions, and portions of said housing surface extend across said openings and are spaced radially outward therefrom defining narrow apertures for limited entry of air into said chamber.

4. The detector unit of any one of the preceding claims wherein said second surface extends away from said intersection a distance of at least one third the corresponding dimension of said frontal surface.

5. The detector unit of claim 1 or 2 wherein the axial extents of both said surfaces from said intersection are substantially the same.

6. The detector unit of claim 1 or 2 wherein said surfaces diverge from each other at an angle of about 150 degrees.

7. The detector unit of claim 1 wherein both said surfaces extend circumferentially about the axis of said unit, said first surface being frusto-conical in shape and said second surface being substantially equal and opposite in shape.

8. The detector unit of claim 1 wherein said means for maintaining maintains said effective ion current at a velocity of oncoming air flow of up to about 2,500 feet per minute.

* * * * *

UNITED STATES PATENT AND TRADEMARK OFFICE
CERTIFICATE OF CORRECTION

PATENT NO. : 4,564,762
DATED : January 14, 1986
INVENTOR(S) : Charles F. Doherty et al.

It is certified that error appears in the above-identified patent and that said Letters Patent is hereby corrected as shown below:

Column 3, line 29, "flow a velocity of $V_1$" is changed to -- flow at velocity of $V_1$ --.

Signed and Sealed this

*Sixteenth* Day of *September 1986*

[SEAL]

*Attest:*

DONALD J. QUIGG

*Attesting Officer* *Commissioner of Patents and Trademarks*